United States Patent
Andersen et al.

(10) Patent No.: US 10,693,404 B2
(45) Date of Patent: Jun. 23, 2020

(54) CONTROL METHODS FOR CONVERTING AN AMOUNT OF ELECTRIC POWER INTO A LOSS FOR MANAGING CONSEQUENCES OF A GRID FAULT

(71) Applicant: SIEMENS AKTIENGESELLSCHAFT, München (DE)

(72) Inventors: Kurt Andersen, Vorbasse (DK); Per Egedal, Herning (DK); Thomas Hjort, Vejleøst (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/268,719

(22) Filed: Sep. 19, 2016

(65) Prior Publication Data

US 2017/0104429 A1    Apr. 13, 2017

(30) Foreign Application Priority Data

Oct. 12, 2015 (EP) .................................. 15189362

(51) Int. Cl.
*H02P 9/00* (2006.01)
*H02P 9/10* (2006.01)
(Continued)

(52) U.S. Cl.
CPC .............. *H02P 9/10* (2013.01); *F03D 7/0264* (2013.01); *F03D 7/0272* (2013.01);
(Continued)

(58) Field of Classification Search
CPC .... F03D 7/0264; F03D 7/0272; F03D 7/0284; F05B 2260/903; F05B 2270/1071;
(Continued)

(56) References Cited

U.S. PATENT DOCUMENTS 7,605,488 B2 * 10/2009 Rebsdorf .................. F03D 7/02
290/44
8,049,352 B2 * 11/2011 Jorgensen ............. F03D 7/0284
290/44
(Continued)

FOREIGN PATENT DOCUMENTS

EP    1499009 A1    1/2005
EP    2628947 A1    8/2013
(Continued)

OTHER PUBLICATIONS

Extended European Search Report dated Apr. 22, 2016; Application No. 15189362.5; 7 pgs.

*Primary Examiner* — Tulsidas C Patel
*Assistant Examiner* — S. Mikailoff
(74) *Attorney, Agent, or Firm* — Schmeiser, Olsen & Watts LLP

(57) ABSTRACT

A method to control a wind power installation is provided. The wind power installation includes a generator and a converter. The generator is configured to convert wind power into electrical power and to provide the electrical power from the generator to the converter. The converter is configured to adapt and to provide the electrical power to an electrical grid. The converter is operable to comply with pre-determined grid code requirements during a grid fault. An amount of electrical power, which is present in the wind power installation during the grid fault, is fed into the generator. The generator is operable to convert the respective amount of electrical power into a generator loss.

5 Claims, 1 Drawing Sheet

(51) Int. Cl.
*F03D 7/02* (2006.01)
*H02K 7/18* (2006.01)
*H02J 3/38* (2006.01)
*H02P 101/15* (2016.01)

(52) U.S. Cl.
CPC ........... *F03D 7/0284* (2013.01); *H02K 7/183* (2013.01); *F05B 2260/903* (2013.01); *F05B 2270/1071* (2013.01); *H02J 3/386* (2013.01); *H02P 2101/15* (2015.01); *Y02E 10/723* (2013.01); *Y02E 10/725* (2013.01); *Y02E 10/763* (2013.01)

(58) Field of Classification Search
CPC ...... H02J 3/386; H02K 7/183; H02P 2101/15; H02P 9/10; Y02E 10/723; Y02E 10/763
USPC ...................................................... 290/44, 55
See application file for complete search history.

(56) References Cited

U.S. PATENT DOCUMENTS

| | | | | |
|---|---|---|---|---|
| 9,564,750 | B2* | 2/2017 | Hiller | ................ G01R 31/34 |
| 2008/0179886 | A1* | 7/2008 | Rebsdorf | ................ F03D 7/02 290/44 |
| 2009/0206603 | A1* | 8/2009 | Llorente Gonzalez | ................ F03D 7/0224 290/44 |
| 2010/0308585 | A1* | 12/2010 | Jorgensen | ............. F03D 7/0284 290/44 |
| 2011/0025059 | A1 | 2/2011 | Hjort et al. | |
| 2011/0140432 | A1 | 6/2011 | Mayor Lusarreta et al. | |
| 2011/0311359 | A1* | 12/2011 | Bjork | ................ F03D 7/0204 416/1 |
| 2014/0015250 | A1* | 1/2014 | Teodorescu | ........... F03D 7/0284 290/44 |
| 2014/0152201 | A1* | 6/2014 | Shriver | ................ F03D 7/0252 318/376 |
| 2014/0248123 | A1* | 9/2014 | Turner | ................ F03D 7/0292 415/1 |
| 2015/0014992 | A1* | 1/2015 | Andresen | ............. F03D 7/0284 290/44 |
| 2015/0188468 | A1* | 7/2015 | Xu | .......................... H02P 9/007 290/44 |
| 2015/0303681 | A1* | 10/2015 | Hiller | ................. H02P 29/0241 322/21 |
| 2017/0104429 | A1* | 4/2017 | Andersen | ............ F03D 7/0284 |
| 2017/0244251 | A1* | 8/2017 | Nielsen | ................ H02J 3/1885 |

FOREIGN PATENT DOCUMENTS

| | | | | |
|---|---|---|---|---|
| GB | | 2460723 A | * 12/2009 | ........... F03D 7/0272 |
| WO | WO 2013083139 | A2 | 6/2013 | |
| WO | WO 2014008647 | A1 | 1/2014 | |

\* cited by examiner

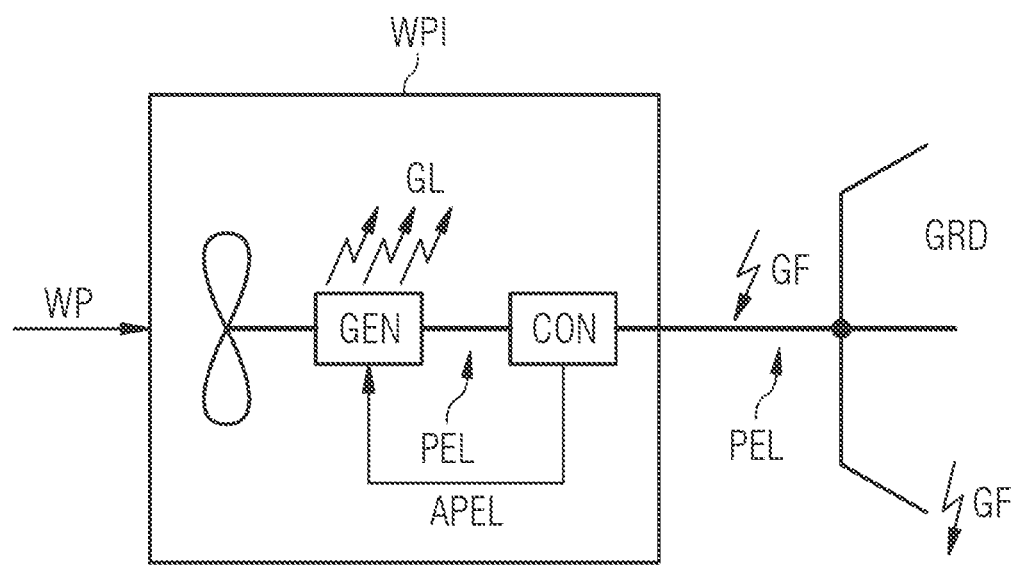

CONTROL METHODS FOR CONVERTING AN AMOUNT OF ELECTRIC POWER INTO A LOSS FOR MANAGING CONSEQUENCES OF A GRID FAULT

CROSS-REFERENCE TO RELATED APPLICATIONS

This application claims priority European application No. EP 15189362.5 having a filing date of Oct. 12, 2015, the entire contents of which are hereby incorporated by reference.

FIELD OF TECHNOLOGY

The following deals with a method to control a wind power installation. The wind power installation comprises a generator and a converter. The generator is operable to convert wind power into electrical power and to provide the electrical power from the generator to the converter. The converter is operable to adapt and to provide the electrical power to an electrical grid. The converter is operable to comply with pre-determined grid code requirements during a grid fault.

BACKGROUND

Wind power installations, like wind turbines or wind power plants, have to comply with given and specified grid codes, which are ruling the behavior of the wind power installations for given situations. These grid codes are specified in dependency of the capabilities of a given grid in a given country. Thus the grid codes known might differ from country to country.

The grid frequency is scheduled and fixed for a given electrical grid. The frequency is influenced by the amount of active power, being fed into the grid by power installations, and by the amount of active power, being consumed and thus taken out of the grid. A shift of this balance results in a grid frequency change. A grid frequency change, which is outside a given tolerance band, is supposed to be a grid fault.

Given grid codes stipulate for this case, that wind power installations have to reduce the feed-in of active power to counteract a rise in the grid frequency or that wind power installations have to increase the feed-in of active power to counteract a fall in the grid frequency.

The grid voltage, which is scheduled and fixed for a given electrical grid, is influenced by reactive power. The reactive power is given and influenced by components of power installations and their technical behavior and of consumers, which are connected to the grid as well.

A grid voltage change, which is below a given tolerance, is supposed to be a grid fault. Given grid codes stipulate for this case, that wind power installations have to increase at least reactive power to counteract a fall in the grid voltage.

Thus the grid codes address the behavior of wind power installations in case of specified grid faults. Respective grid fault functionalities are known as "Frequency Ride Through, FRT" or as "Low Voltage Ride Through, LVRT" for example.

The grid codes aim for a specified and known behavior of the wind power installations during grid faults. If possible they should stay connected with the electrical grid instead of disconnecting thus a faster grid fault response of the wind power installations in view to the stability of the electrical grid is ensured.

If a wind turbine is exposed to the consequences of a grid fault, the load situation, which is acting on the rotating parts of a wind turbine (rotor, hub, shaft, generator) is decreased. Thus results in higher speed and in higher vibrations as the load, acting on the components, is changed. This rotational kinetic energy is present in the wind power installation during the grid fault and needs to be handled in a specific way to avoid harming of components.

Load changes will be experienced most at the rotating blades of the wind turbine, if the wind turbine is a so called "direct drive" wind turbine (thus there is no gear box connected with the generator). The load changes will result in a kind of "whiplash", which put high strains on the blades and thus causing excessive wear and damages.

It is known to use resistive loads in a converter of a wind power installation to reduce the electrical power, which is present in the wind power installation during the fault.

Thus redundant power will not damage the wind turbine converter or other components.

It is even known to use so called "dumpload" resistors in the wind power installation. They are used to convert redundant power into heat. Due to the function of the resistors they show a considerable size, weight and price.

SUMMARY

An aspect relates to an improved control method to manage consequences of a grid fault, which are acting on a wind power installation.

Embodiments of the invention deal with a method to control a wind power installation. The wind power installation comprises a generator and a converter. The generator is operable to convert wind power into electrical power and to provide the electrical power from the generator to the converter. The converter is operable to adapt and to provide the electrical power to an electrical grid. The converter is operable to comply with pre-determined grid code requirements during a grid fault. According to embodiments of the invention an amount of electrical power, which is present in the wind power installation during the grid fault, is fed (back) into the generator. The generator is operable to convert the respective amount of electrical power into a loss in the generator.

In a preferred configuration the generator is operable to convert the respective amount of electrical power into a thermal loss. Thus the electrical power might be finally injected into windings and into the iron of the generator. Thus the injected electrical power is transformed into heat by the resistance loss in the windings and into iron loss in the iron of the generator, resulting in a thermal energy loss in the generator.

In a preferred configuration the generator is operable to convert the respective amount of electrical power into a magnetic loss. Thus the electrical power might be used to increase the magnetic field inside the generator. Thus the injected electrical power is transformed into an increased magnetic flux density, resulting in a generator loss.

In a preferred configuration the converter controls the distribution and the conversion of the electrical power, which is present in the wind power installation during the grid fault.

In a preferred configuration the converter stays connected with the electrical grid during the fault. It even may be disconnected from the electrical grid during the fault, depending in the respective grid code requirements.

In a preferred configuration the grid fault results in a reduction of load, which is acting on rotating parts of the generator. The load reduction results in an increase of the number of rotations of the generator.

In a preferred configuration another amount of electrical power, which is present in the wind power installation during the grid fault, is fed in a parallel manner into another component of the wind power installation. This component is operable to convert the respective amount of electrical power into a loss, too.

In a preferred configuration a hydraulic pump and/or a yaw system and/or a pitch system of the wind power installation is/are used as converting component.

In a preferred configuration the converter of the wind power installation performs a first control strategy, which is used to control an amount of active power being fed into the grid during the grid fault for grid support purposes. The converter of the wind power installation performs a second control strategy, which is used to control an amount of reactive power being fed into the grid during the grid fault for grid support purposes. Finally the converter of the wind power installation performs a third control strategy, which is used to control the conversion of electrical power into the respective losses.

In a preferred configuration the wind power installation is a wind turbine or a wind power plant.

Embodiments of the invention result in a specified loss management, which can be in the range of 20-100% of the operational power of the wind power installation or wind turbine.

The method invented results in a limited range of mechanical load-changes, which needs to be handled during a "Frequency Ride Through, FRT" or a "Low Voltage Ride Through, LVRT" for example.

The method invented results in an actively dampened load oscillation.

The method invented allows the reduction of the capacity or even the complete avoidance of DC link brake-resistors, which are located in the converter of a wind turbine for example.

The method invented results in a reduction of the load, which is even acting on the rotor of the wind turbine. Thus its lifetime is increased, which in turn allows the reduction of requirements for the structural strength of the wind turbine.

The method invented results in a load controller, which provides a loading scheme of the main rotor of the wind turbine for example, even if the grid is disconnected or if a severe fault leads to a reduced impact of the grid at loads of the wind power installation.

The method invented results in controlled oscillations acting on the components of the mechanical system of the wind turbine without impacting the main function.

BRIEF DESCRIPTION

Some of the embodiments will be described in detail, with reference to the following figures, wherein like designations denote like members, wherein:

FIG. 1 shows a preferred embodiment of the invention.

DETAILED DESCRIPTION

This FIGURE is only an example and does not limit the scope of embodiments of the invention.

The wind power installation WPI comprises a generator GEN and a converter CON.

The generator GEN is operable to convert wind power WP into electrical power PEL. The electrical power PEL from the generator GEN is provided to the converter CON.

The converter CON is operable to adapt and to provide the electrical power PEL to an electrical grid GRD.

The converter CON is operable to comply with pre-determined grid code requirements during a grid fault GF, which might happen at the grid GRD.

According to embodiments of the invention an amount of electrical power APEL, which is present in the wind power installation during the grid fault GF, is fed back into the generator GEN.

The generator GEN is operable to convert the respective amount of electrical power APEL into a thermal loss GL in the generator GEN.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The claims are as follows:

1. A method to control a wind power installation exposed to a grid fault, the wind power installation including a generator and a converter, the generator configured to convert wind power into electrical power and to provide the electrical power to the converter, the converter configured to provide a converted electrical power to an electrical grid, in compliance with pre-determined grid code requirements during the grid fault, the method comprising:
feeding, by the converter, an amount of electrical power generated by the generator from rotational kinetic energy of the wind power installation during the grid fault, back into the generator;
transforming the amount of electrical power into a loss in the generator by feeding the amount of electrical power into at least one winding of the generator to cause resistance loss and into an iron core of the generator to cause iron loss, wherein the transforming the amount of electrical power into a loss in the generator is controlled by the converter.

2. The method according to claim 1, further comprising: controlling, by the converter, a distribution of the amount of electrical power.

3. The method according to claim 1, wherein a second amount of electrical power during the grid fault is fed into another component of the wind power installation, and wherein the component is configured to convert the second amount of electrical power into a thermal loss, wherein the component is at least one of a hydraulic pump, a yaw system, and a pitch system of the wind power installation.

4. The method according to claim 2, wherein the converter of the wind power installation controls an amount of active power being fed into the grid during the grid fault for grid support purposes, wherein the converter of the wind power installation controls an amount of reactive power being fed into the grid during the grid fault for grid support purposes after controlling the amount of active power being fed into the grid during the grid fault for grid support purposes, and wherein the converter of the wind power installation feeds the amount of electrical power generated by the generator during the grid fault back into the generator from the converter after controlling the amount of reactive power being fed into the grid during the grid fault for grid support purposes.

5. The method according to claim 1, wherein the wind power installation is a wind turbine or a wind power plant.

* * * * *